UNITED STATES PATENT OFFICE.

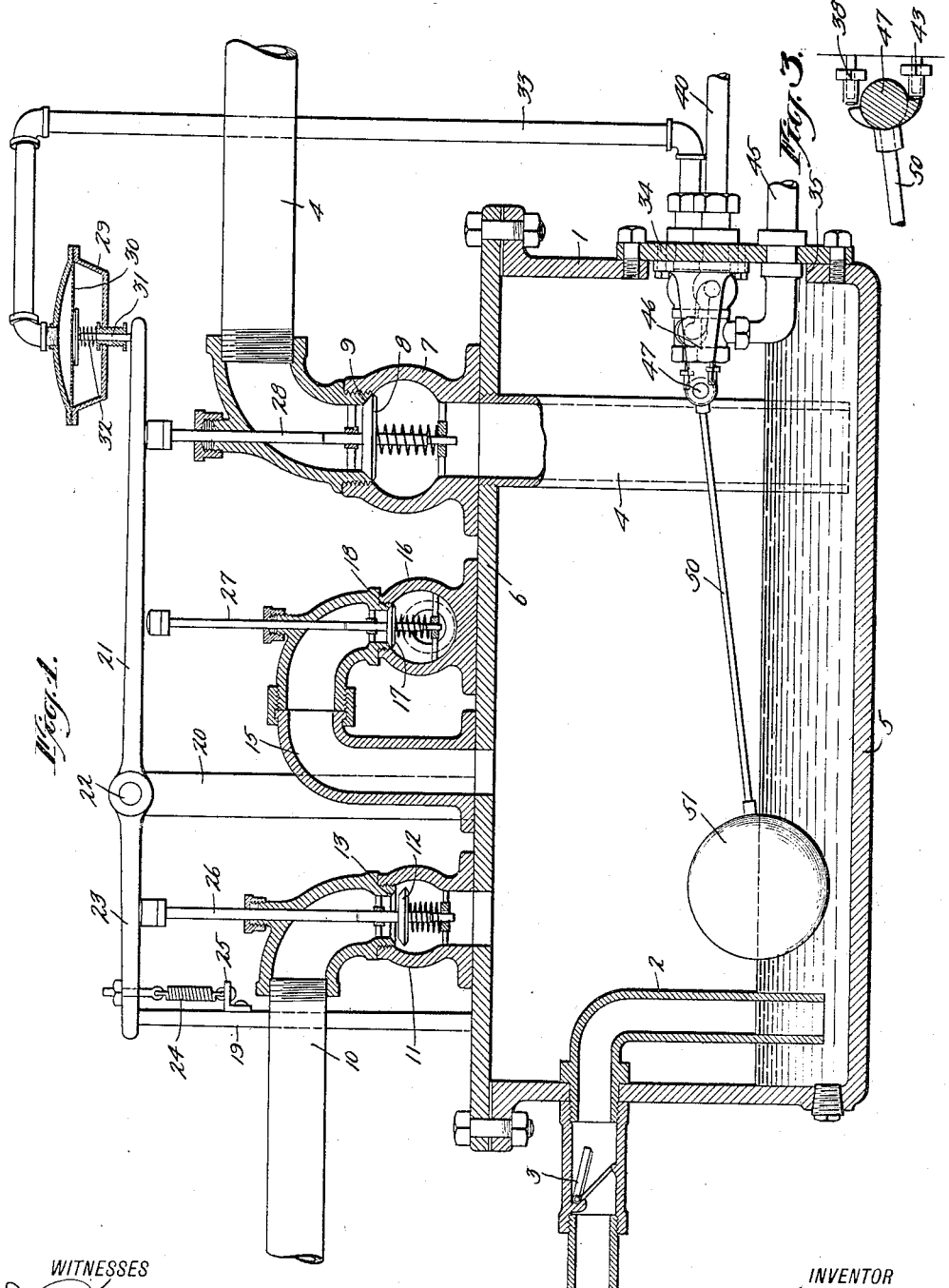

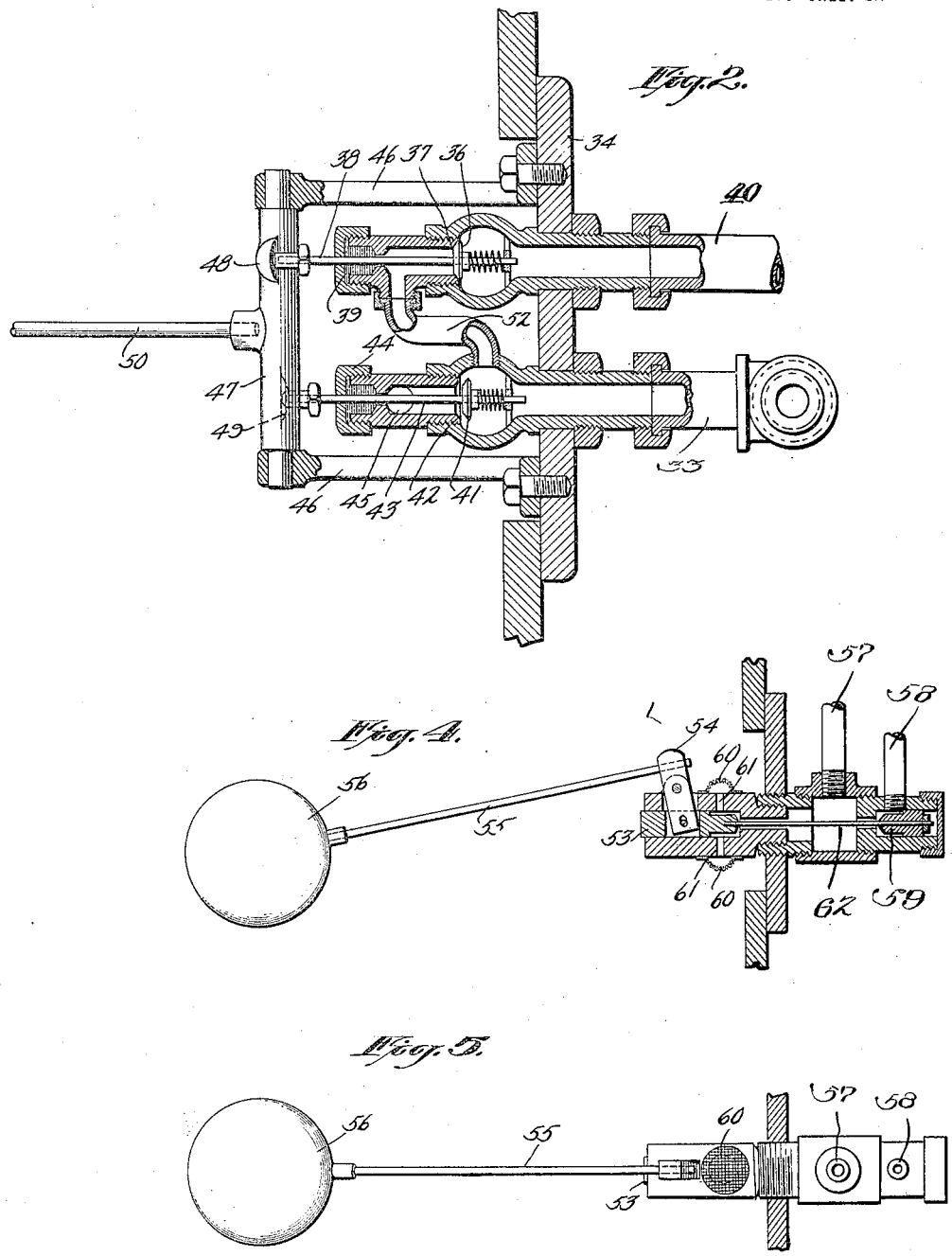

HENRY W. JUSTUS, OF NAPANOCH, NEW YORK.

TRAP.

1,380,971.  Specification of Letters Patent.  Patented June 7, 1921.

Application filed March 15, 1920. Serial No. 365,983.

*To all whom it may concern:*

Be it known that I, HENRY W. JUSTUS, a citizen of the United States, and a resident of Napanoch, in the county of Ulster and State of New York, have invented a new and Improved Trap, of which the following is a full, clear, and exact description.

This invention relates to improvements in traps, and more particularly to traps for water of condensation, an object of the invention being to provide an improved construction of trap automatically controlled by a float in the trap and adapted to force the water to a tank at a higher elevation or return the same to the boiler.

A further object is to provide an improved arrangement of diaphragm and means operated thereby for controlling the flow of water from the trap through the medium of live steam admitted to the trap to exert a pressure on the water, the operation of said diaphragm being controlled by the position of a float in the trap.

With these and other objects in view the invention consists in certain novel features of construction, and combinations and arrangements of parts as will be more fully hereinafter described and pointed out in the claims.

In the accompanying drawings—

Figure 1 is a view mainly in longitudinal section, but partly in elevation illustrating my invention;

Fig. 2 is a view in horizontal section through the valves controlling the passage of steam to the diaphragm chamber and also illustrating adjacent parts, both valves being shown in section, but it is to be understood that they are at slightly different elevations;

Fig. 3 is a fragmentary view in section through the rocker shaft 47 and adjacent parts; and Figs. 4 and 5 are views in vertical section and top plan illustrating a modification.

1 represents the casing of my improved trap having a water inlet 2 extending to a point adjacent the bottom of the trap and having a check valve 3 permitting a flow in one direction only. 4 represents a water outlet pipe which also extends to a point near the bottom 5 of the trap and also projects through the top 6 of the trap so as to convey the water upwardly to a suitable tank or return the same to the boiler.

A valve casing 7 is located between the ends of the pipe 4 and is supported on the top 6. An upwardly spring pressed check valve 8 is provided in the valve casing 7 and is normally held in closed position against a seat 9. 10 represents an outlet pipe for steam and vapor which communicates with the chamber through the top thereof and is provided with a valve casing 11 having an upwardly spring pressed check valve 12 which is normally open, but which, when closed, engages a seat 13 in the casing 11.

15 represents a steam pipe which is adapted to convey live steam to the upper portion of the trap and this pipe 15 is provided between its ends with a valve casing 16 supported on the top 6 of the trap and having a spring pressed valve 17 therein normally engaging a seat 18 so as to normally shut off the supply of steam to the trap.

A pair of posts 19 and 20 are supported on the top 6. A normally horizontal lever 21 is pivotally mounted on the post 20 as shown at 22, and this pivot point is nearer one end of the lever than the other. The shorter end 23 of the lever 21 is connected by a coiled spring 24 with a bracket 25 on the post 19 normally holding the lever against the top of the post which is, therefore, the normal position of the lever.

The valves 12, 17 and 8 are provided with upwardly projecting valve stems 26, 27 and 28 respectively. The valve stem 26 engages the under face of the shorter end 23 of the lever 21 so that the valve 12 is normally held by the lever in open position. The upper end of the stem 27 is normally slightly spaced from the lower face of the lever 21 so that the valve 17 is maintained normally in closed position. The upper end of the stem 28 is located directly under and may be in contact with the lower face of the longer end of the lever, but it is to be understood that the valve 8 operated by the stem 28 is also normally closed.

29 represents a diaphragm casing having a diaphragm 30 therein and a plunger 31 connected to the under face of the diaphragm and engaging the upper face of the longer end of lever 21. A spring 32 is provided in the casing 29 and assists in maintaining the diaphragm in normal position. A steam pipe 33 at its outlet end communicates with the upper portion of diaphragm casing 29 and this pipe 33 at its inlet end extends through and is supported by a plate 34 which is removably connected to a wall of the trap and covers an opening 35 in the trap and can be removed and replaced as occasion may require. The inlet end of the pipe 33 is substantially horizontal and is provided with a spring pressed check valve 41 normally engaging a seat 42 and provided with a stem 43 projecting through a stuffing box 44 in the end of the pipe 33.

40 represents a supply pipe which also projects through the plate 34 and is provided with a spring presed check valve 36 adapted to engage a seat 37 and provided with a stem 38 projecting through a stuffing box 39 on the end of the pipe 40. A by-pass pipe 52 connects the pipe 40 at a point beyond the valve 41 with the pipe 33 at a point in advance of the valve 36. A pipe 45 communicates with the pipe 40 and exhausts into the atmosphere.

A pair of bracket arms 46 are supported by and project inwardly from the plate 34 and these bracket arms 46 support a rocker shaft 47. This shaft 47 is provided on its upper face with a lug 48 adapted to engage the stem 38 of valve 36 and said rocker shaft is provided on its lower face with a lug 49 adapted to normally engage the stem 43 of valve 41. A rod 50 is fixed at one end to the rocker shaft 47 and at its free end carries a float 51 which is raised and lowered by the level of water in the tank.

Figs. 1 and 2 illustrate the parts in normal position with the water accumulating in the trap and the equalizer valve 12 open so as to allow vapor and steam to escape and relieve pressure in the trap. As the level of water in the trap rises, the float 51 is elevated and causes a turning movement of the rocker shaft 47. When the water reaches the desired level, the lug 49 will free the stem 43 to permit the valve 41 to close and will, through the medium of the lug 48, move the stem 38 to open the valve 36, thus allowing the live steam from the pipe 40 to flow through the by-pass pipe 52 into pipe 33 and as the valve 36 is opened, the steam will flow through the pipe 33 into the upper portion of the diaphragm casing 29. The steam in the casing 29 will exert a downward pressure on the diaphragm 30 and the plunger 31 to move the longer end of the lever 21 downwardly. This movement of the lever 21 will open the valve 8 in the water outlet pipe 4 and permit the equalizer valve 12 to close. As the longer end of the lever 21 continues to move downwardly, it will, through the medium of the stem 27, open the steam inlet valve 17 and allow the live steam to enter the upper portion of the casing 1 and force the water through the outlet pipe 4 to a tank above the trap or back to the boiler as may be desired.

As the water escapes, the float 51 will lower in the trap and will, through the medium of the rocker shaft 47, cause the valve 36 to close shutting off the steam to the diaphragm casing and opening the valve 41 to allow the steam to exhaust to the atmosphere through the pipe 45. When the pressure of steam is cut off, the spring 24 will return the lever 21 to normal position permitting the spring pressed valves to return to their normal positions as shown in Fig. 1, with the valve 17 shutting off the supply of live steam, the valve 8 closing the water outlet pipe and the valve 12 opening the pipe 10 to allow the escape of steam and vapor in the trap so as not to interfere with the operation thereof.

In the modification illustrated in Fig. 4, I show an outlet valve controlling the flow of water or steam to the diaphragm casing which may be substituted for the form above illustrated and described. With this form of my invention I provide a sliding valve 53 operated by a pivotally supported arm 54 having a rod 55 secured thereto and carrying a float 56 at its free end. The flow upwardly through the pipe 57 is controlled by the valve 53 and it is to be understood that this pipe 57 will communicate with the upper portion of the diaphragm casing 29. A drain pipe 58 communicates with the pipe 57 and is provided with a needle valve 59 connected by a stem 62 with the valve 53 to allow the water or steam in pipe 57 to drain when the valve 53 is closed. With this form of my invention I preferably provide screens 60 over the inlet 61 so as to prevent foreign matter from entering the valve chamber and the pipes.

I would have it understood that my improved trap is capable of a wide range of utility and may be used in connection with various apparatus, as for example, as an automatic pump control, automatic boiler feed, or in any other place where a powerful and reliable automatic valve control is desired.

Various other slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A trap of the character stated, comprising a casing, a water inlet pipe discharging into the casing, a check valve in said pipe, a water outlet pipe having its entrance end located adjacent the bottom of the casing and extending through the top of the casing, a valve normally closing the passage through said outlet pipe, a steam inlet pipe communicating with the casing, a normally closed valve in said steam inlet pipe, a diaphragm casing, a diaphragm in said casing, means operatively connecting said diaphragm with the valves in the outlet pipe and the steam inlet pipe, means controlling the flow of fluid to the diaphragm chamber, and a float valve in the casing controlling the operation of said last-mentioned means.

2. A trap of the character stated, comprising a casing, a water inlet pipe discharging into the casing, a check valve in said pipe, a water outlet pipe having its entrance end located adjacent the bottom of the casing and extending through the top of the casing, a valve normally closing the passage through said outlet pipe, a steam inlet pipe communicating with the casing, a normally closed valve in said steam inlet pipe, a diaphragm casing, a diaphragm in said casing, means operatively connecting said diaphragm with the valves in the outlet pipe and the steam inlet pipe, means controlling the flow of fluid to the diaphragm chamber, a float valve in the casing controlling the operation of said last-mentioned means, a pressure equalizing outlet pipe in the top of the casing, a normally open valve in said equalizer outlet pipe, and said last-mentioned valve permitted to close prior to the opening of the steam inlet valve.

3. A trap of the character described, comprising a casing, a water inlet pipe discharging into the casing, a water outlet pipe extending through the top of the casing, a normally closed spring pressed valve in said outlet pipe, a steam inlet pipe communicating with the top of the casing, a normally closed spring pressed valve in said steam inlet pipe, an equalizer outlet pipe communicating with the top of the casing, a normally open spring pressed valve in said equalizer pipe, a lever pivotally supported between its ends and at one end normally holding the last-mentioned valve open, a diaphragm casing, a diaphragm in the casing, means connected to the diaphragm and engaging the lever, whereby the downward movement of the diaphragm operates to open the valves in the water outlet pipe and the steam inlet pipe and permit the closing of the valve in the equalizer pipe, and float operating means controlling the flow of fluid to the diaphragm casing.

4. A trap of the character described, comprising a casing, a water inlet pipe discharging into the casing, a water outlet pipe extending through the top of the casing, a normally closed spring pressed valve in said outlet pipe, a steam inlet pipe communicating with the top of the casing, a normally closed spring pressed valve in said steam inlet pipe, an equalizer outlet pipe communicating with the top of the casing, a normally open spring pressed valve in said equalizer pipe, a lever pivotally supported between its ends and at one end normally holding the last-mentioned valve open, a diaphragm casing, a diaphragm in the casing, means connected to the diaphragm and engaging the lever, whereby the downward movement of the diaphragm operates to open the valves in the water outlet pipe and the steam inlet pipe and permit the closing of the valve in the equalizer pipe, a steam pipe communicating with the top of the diaphragm casing, and a float valve in the casing controlling the flow of steam to the diaphragm casing.

5. A trap of the character described, comprising a casing, a water inlet pipe discharging into the casing, a water outlet pipe extending through the top of the casing, a normally closed spring pressed valve in said outlet pipe, a steam inlet pipe communicating with the top of the casing, a normally closed spring pressed valve in said steam inlet pipe, an equalizer outlet pipe communicating with the top of the casing, a normally open spring pressed valve in said equalizer pipe, a lever pivotally supported between its ends and at one end normally holding the last-mentioned valve open, a diaphragm casing, a diaphragm in the casing, means connected to the diaphragm and engaging the lever, whereby the downward movement of the diaphragm operates to open the valves in the water outlet pipe and the steam inlet pipe and permit the closing of the valve in the equalizer pipe, float operating means controlling the flow of fluid to the diaphragm casing, and a spring holding the lever in normal position.

6. A trap of the character described, comprising a casing, a valved water inlet pipe discharging into the casing, a water outlet pipe communicating with the bottom of the casing and extended through the top of the casing, a steam inlet pipe communicating with the top of the casing, a normally closed valve in said steam inlet pipe, a lever operatively connected to both of said last-mentioned valves, a diaphragm casing, a diaphragm in the casing, means on the diaphragm engaging the lever, a steam pipe extending from the interior of the trap casing to the top of the diaphragm casing, a steam inlet pipe projecting into the trap casing, a by-pass pipe connecting the last-mentioned pipes, valves in said last-mentioned pipes, a steam return pipe communicating with the last-mentioned steam inlet pipe, and a float operatively connected to and controlling said last-mentioned valves.

7. A trap of the character described, comprising a casing, a valved water inlet pipe discharging into the casing, a water outlet pipe communicating with the bottom of the casing and extended through the top of the casing, a steam inlet pipe communicating with the top of the casing, a normally closed valve in said steam inlet pipe, a lever operatively connected to both of said last-mentioned valves, a diaphragm casing, a diaphragm in the casing, means on the diaphragm engaging the lever, a steam pipe extending from the interior of the trap casing to the top of the diaphragm casing, a steam inlet pipe projecting into the trap casing, a by-pass pipe connecting the last-mentioned pipes, valves in said last-mentioned pipes, a steam return pipe communicating with the last-mentioned steam inlet pipe, a rocker shaft mounted in the casing, lugs on the rocker shaft constructed to operate the two last-mentioned valves, a rod on the rocker shaft, and a float on the free end of the rod.

8. A trap, comprising a casing, a water inlet pipe extending into the casing, a water outlet pipe extending through the top of the casing, a steam inlet pipe communicating with the top of the casing, an equalizing pipe communicating with the top of the casing, check valves in all of said pipes, a pair of posts on top of the casing, a lever pivotally mounted between its ends on one of said posts, a spring normally holding said lever against the other of said posts, stems operatively connected to the valves of the water outlet pipe, the steam inlet pipe and the equalizing pipe, said stems located under the lever and operated thereby, a diaphragm casing, a diaphragm in the casing, a device secured to the diaphragm and engaging one end of the lever, a float in the casing, and means operated by the float controlling the flow of fluid to the diaphragm casing.

HENRY W. JUSTUS.